(12) United States Patent
Craig et al.

(10) Patent No.: US 8,113,429 B2
(45) Date of Patent: Feb. 14, 2012

(54) BARCODE READING STATION

(75) Inventors: Jack W. Craig, Oviedo, FL (US); Jason A. Mastry, Sanford, FL (US); Rafael Yepez, Sanford, FL (US); Randall L. Morrison, Oviedo, FL (US)

(73) Assignee: NCR Corporation, Duluth, GA (US)

( * ) Notice: Subject to any disclaimer, the term of this patent is extended or adjusted under 35 U.S.C. 154(b) by 462 days.

(21) Appl. No.: 12/337,758

(22) Filed: Dec. 18, 2008

(65) Prior Publication Data
US 2010/0155483 A1    Jun. 24, 2010

(51) Int. Cl.
*G06K 7/10* (2006.01)
(52) U.S. Cl. .......... 235/462.32; 235/472.01; 235/462.45
(58) Field of Classification Search .......... 235/462.45, 235/462.46, 472.01, 472.02, 472.03, 462.32
See application file for complete search history.

(56) References Cited

U.S. PATENT DOCUMENTS

| 5,105,070 A | 4/1992 | Wike, Jr. |
| 5,155,346 A * | 10/1992 | Doing et al. ............. 235/462.45 |
| 5,214,270 A | 5/1993 | Rando |

FOREIGN PATENT DOCUMENTS

| EP | 0425274 A2 | 5/1991 |
| WO | 0209023 A1 | 1/2002 |

OTHER PUBLICATIONS

European Search Report for EP Application 09169298.8 mailed May 3, 2010.

* cited by examiner

*Primary Examiner* — Karl D. Frech
(74) *Attorney, Agent, or Firm* — Paul W. Martin

(57) ABSTRACT

A barcode reading station which mounts a barcode reader for reading a barcode on a barcode carrier, such as a document or electronic device which displays the barcode. The barcode reading station includes a holster for a barcode reader, the barcode reader producing a scan volume, a barcode reading table for identifying a target location for barcode reading, and a mirror for deflecting the scan volume of the barcode reader towards the barcode reading table.

15 Claims, 4 Drawing Sheets

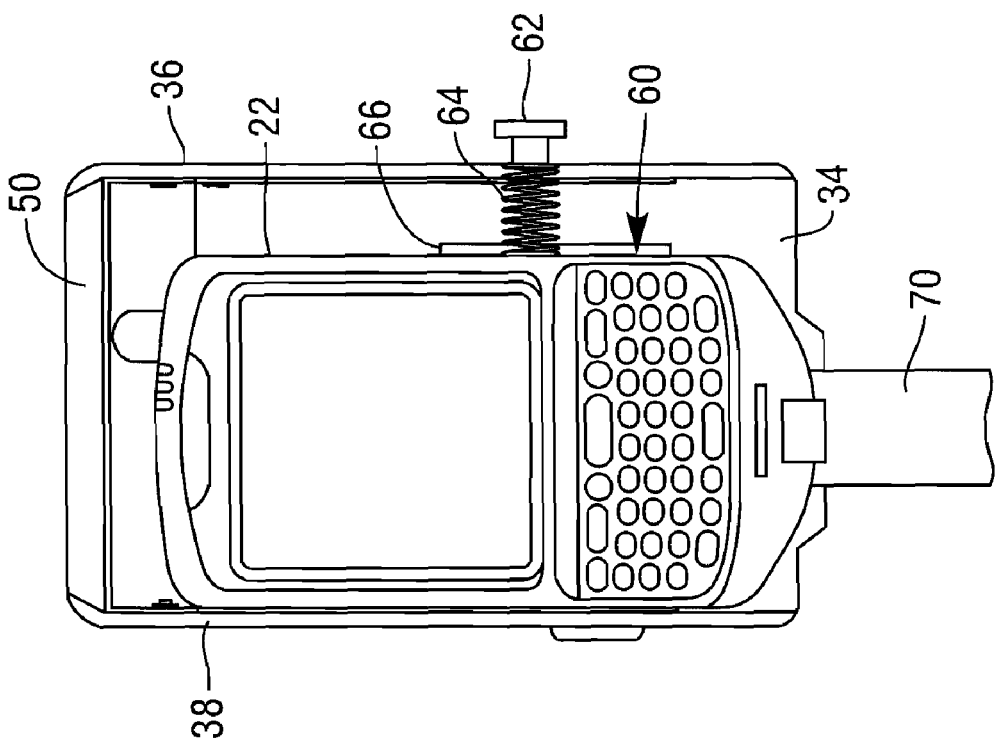
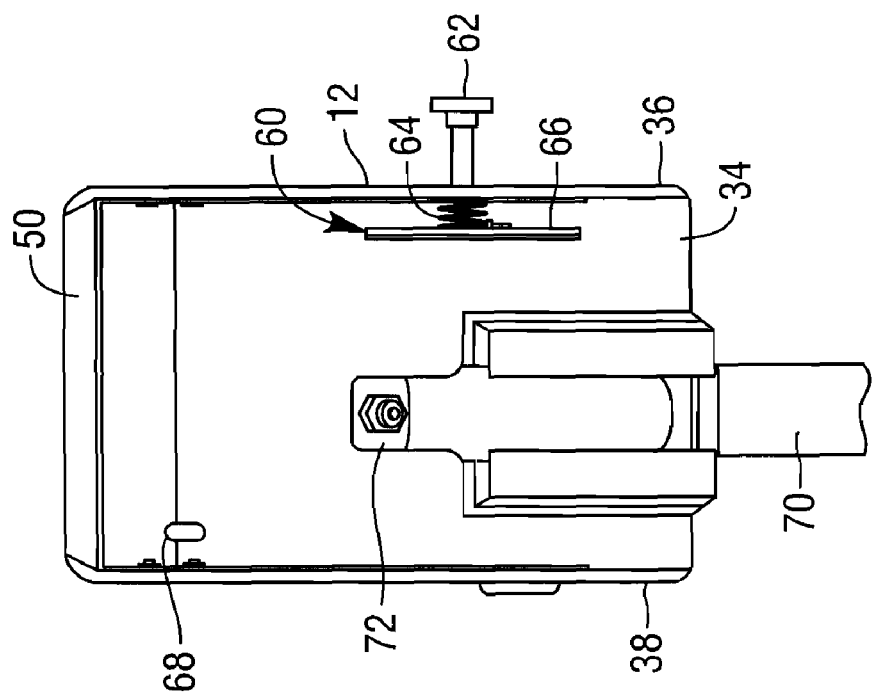

BARCODE READING STATION

BACKGROUND

Barcode readers are useful for reading barcodes on many different types of items. Hand-held barcode readers have the advantage of being portable, but in some venues having to hold a hand-held barcode reader is a disadvantage.

It would be desirable to provide a barcode reading station for mounting a hand-held barcode reader.

SUMMARY

A barcode reading station is provided.

The barcode reading station includes a holster for a barcode reader, the barcode reader producing a scan volume, a barcode reading table for identifying a target location for barcode reading, and a mirror for deflecting the scan volume of the barcode reader towards the barcode reading table.

DESCRIPTION OF THE DRAWINGS

FIGS. 3-4 are views of the barcode reading station illustrating mounting and removal of the hand-held barcode reader.

DETAILED DESCRIPTION

Figure 2:
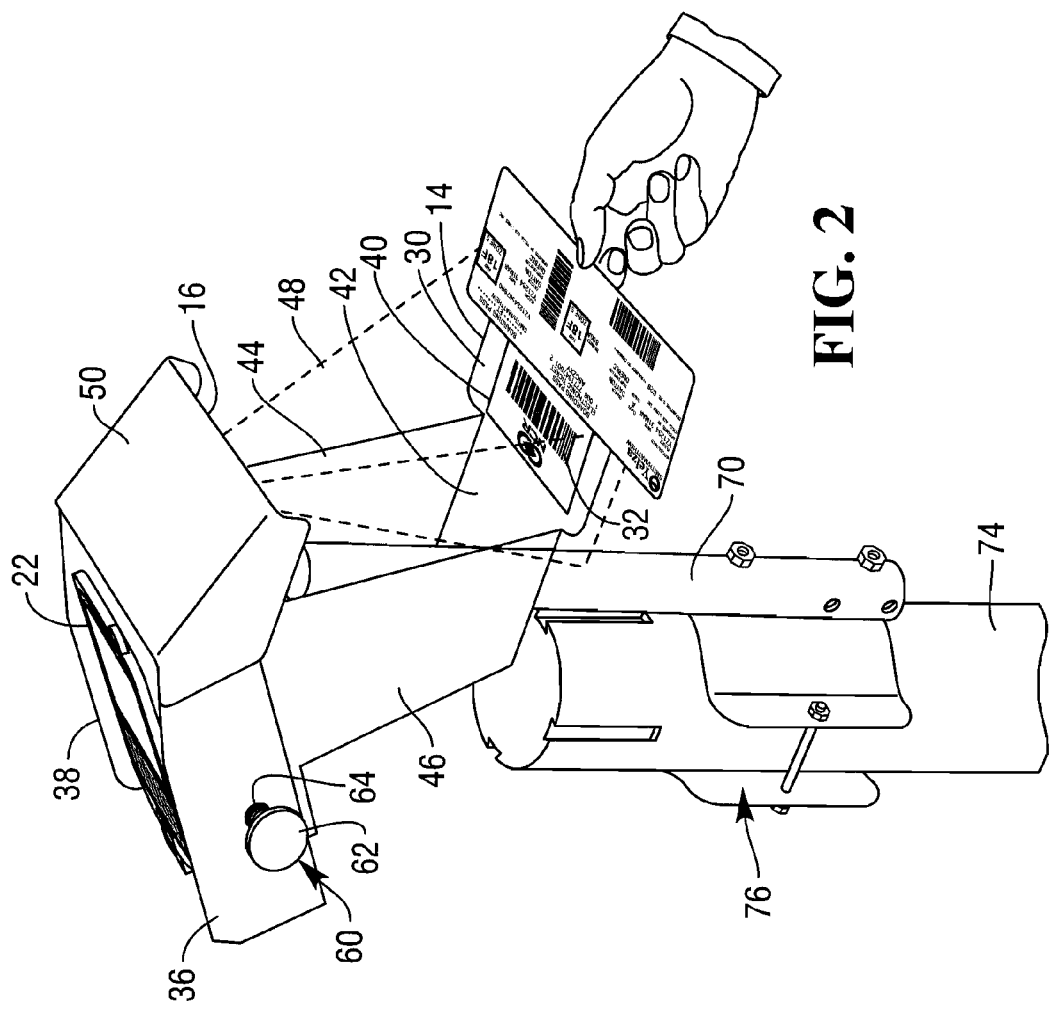
FIGS. 1-2 are perspective views of an example barcode reading station including a hand-held barcode reader.
Figure 1:
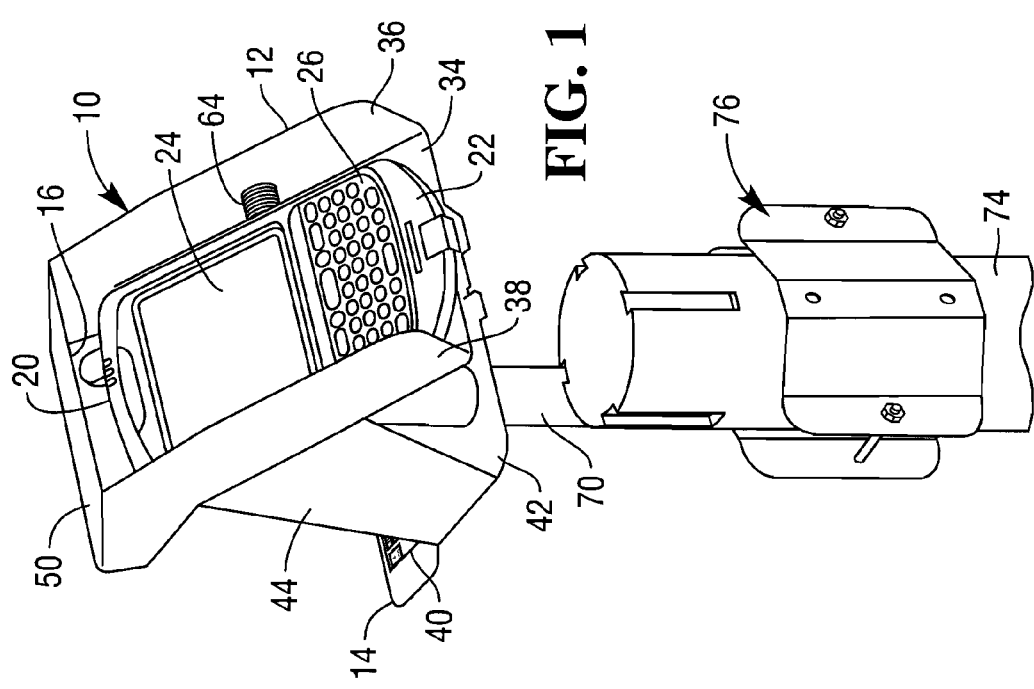

With reference to FIGS. 1 and 2, barcode reading station 10 includes holster 12, barcode reading table 14, and deflecting mirror 16.

Holster 12 retains barcode reader 20.

Barcode reader 20 reads a barcode 32 on a barcode carrier 30. Barcode carrier 30 may include a document, such as a boarding pass. Barcode carrier 30 may also be an electronic display device capable of displaying barcode 32, such as a cellular phone or hand-held computer or terminal, including a personal digital assistant, enterprise digital assistant. Barcode carrier 30 may include other types of hand-held barcode display devices.

An example barcode reader 20 may include a hand-held barcode reader, either by itself or packaged as part of a cellular phone or hand-held computer or terminal, such as a personal digital assistant, enterprise digital assistant, scanning terminal, or may include other types of hand-held barcode reading devices.

Barcode reader 20 is illustrated as part of hand-held barcode reading terminal 22. In addition to barcode reader 20, barcode reading terminal 22 includes liquid crystal display 24 and keypad 26. Barcode reading terminal 22 may also include wireless networking circuitry for communicating with a host server. Barcode reading terminal 22 may validate barcode 32 using public keys stored locally by barcode reading terminal 22.

In one example use, barcode reading terminal 22 may connect to airline host systems to validate the status of boarding pass barcodes in real time. Barcode reading terminal 22 may additionally connect to a database of passports and driver's licenses to validate individual driver's licenses and passports. The connection may be a wireless networking connection.

Holster 12 may be oriented at a downward angle from horizontal to minimize viewing of displayed information by anyone but an authorized operator. The downward angle is also ergonomic for operator viewing. For example, if barcode carrier 30 is a boarding pass or other travel document, airport security operators would be able to operate barcode reading terminal 22 without travelers seeing what barcode reading terminal 22 was displaying.

Barcode reader 20 may include an optical barcode scanner, light emitting diode scanner, imaging barcode scanner, or other technology for reading barcodes.

An example holster 12 includes bottom support wall 34, right side wall 36, and left side wall 38. With reference also to FIGS. 3 and 4, holster 12 may further include a spring loaded clamp 60 for holding barcode reading terminal 22 in place. An operator retracts plunger 62 against the force of spring 64 before inserting or removing barcode reading terminal 22 from holster 12. A locating pin 68 helps the operator correctly position barcode reading terminal 22 for proper distance from deflecting mirror 16 for scanning. When plunger 62 is released, plate 66 pushes against barcode reading terminal 22 to hold barcode reading terminal 22 in place within holster 12. Spring loaded clamp 60 accommodates scanning terminals 22 of various widths.

Barcode reading table 14 is coupled to holster 12 and provides a target location for positioning barcode carrier 30 within scan volume 48 of barcode reader 20. Barcode reading table 14 may include an overlay or label 40 to communicate the location of scan volume 48 to the bearer of barcode carrier 30.

In the illustrated example, barcode reading table 14 is coupled to an extension wall 42 that is further coupled to holster 12 via support walls 44 and 46. Barcode reading table 14 is located at a fixed distance from barcode reading terminal 22.

Deflecting mirror 16 optically links barcode reader 20 with barcode carrier 30 by directing the scan volume 48 towards barcode reading table 14. Deflecting mirror 14 is mounted under hood 50, which is fastened to side walls 36 and 38.

Barcode reading station 10 may be mounted in various ways, to existing structures or as a free standing station. For example, barcode reading station 10 may be mounted to a pole 70. Pole 70 passes through an aperture in extension wall 42 and couples to an attachment fitting 72 (FIG. 3) under holster 12.

Pole 70 may in turn be mounted to an extension pole or another structure. For example, in airport venues, pole 70 may be mounted to a temporary aisle pole 74 using bracket 76. The height of barcode reading station 10 may be based upon median or average heights of operators and document bearers.

Figure 6:
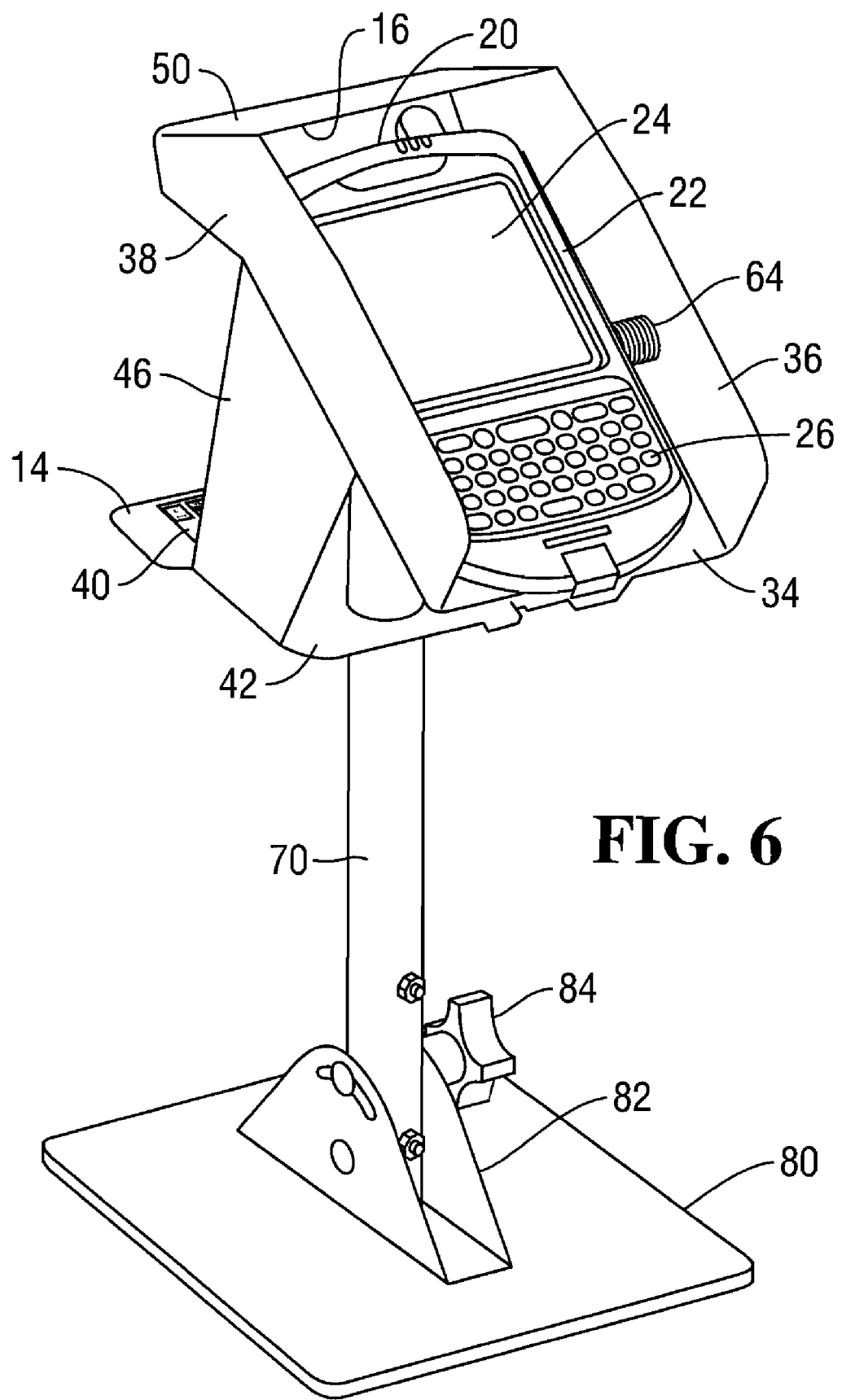
FIG. 6 is a perspective view illustrating an alternative example technique of the barcode reading station.

Pole 70 may alternatively be mounted to a base plate 80 (FIG. 6) or to an extension pole mounted to base plate 80 to create a free standing station.

Base plate 80 may include a bracket 82 which couples to pole 70 via a bolt or other fastener. Bracket 82 may be capable of angular adjustment to accommodate location of barcode reading station 10 on non-level surfaces. A manually adjustable locking knob 84 may fix the angle of base plate 80 with respect to pole 70.

Barcode reading station 10 may be made of metal and powder coated for durability. All or portions of barcode reading station 10 may alternatively be made of formed or molded high strength plastic. For example, holster 12 may be made of plastic to aid wireless radio wave transmission if hand-held barcode reading terminal 22 is so equipped.

Figure 5:
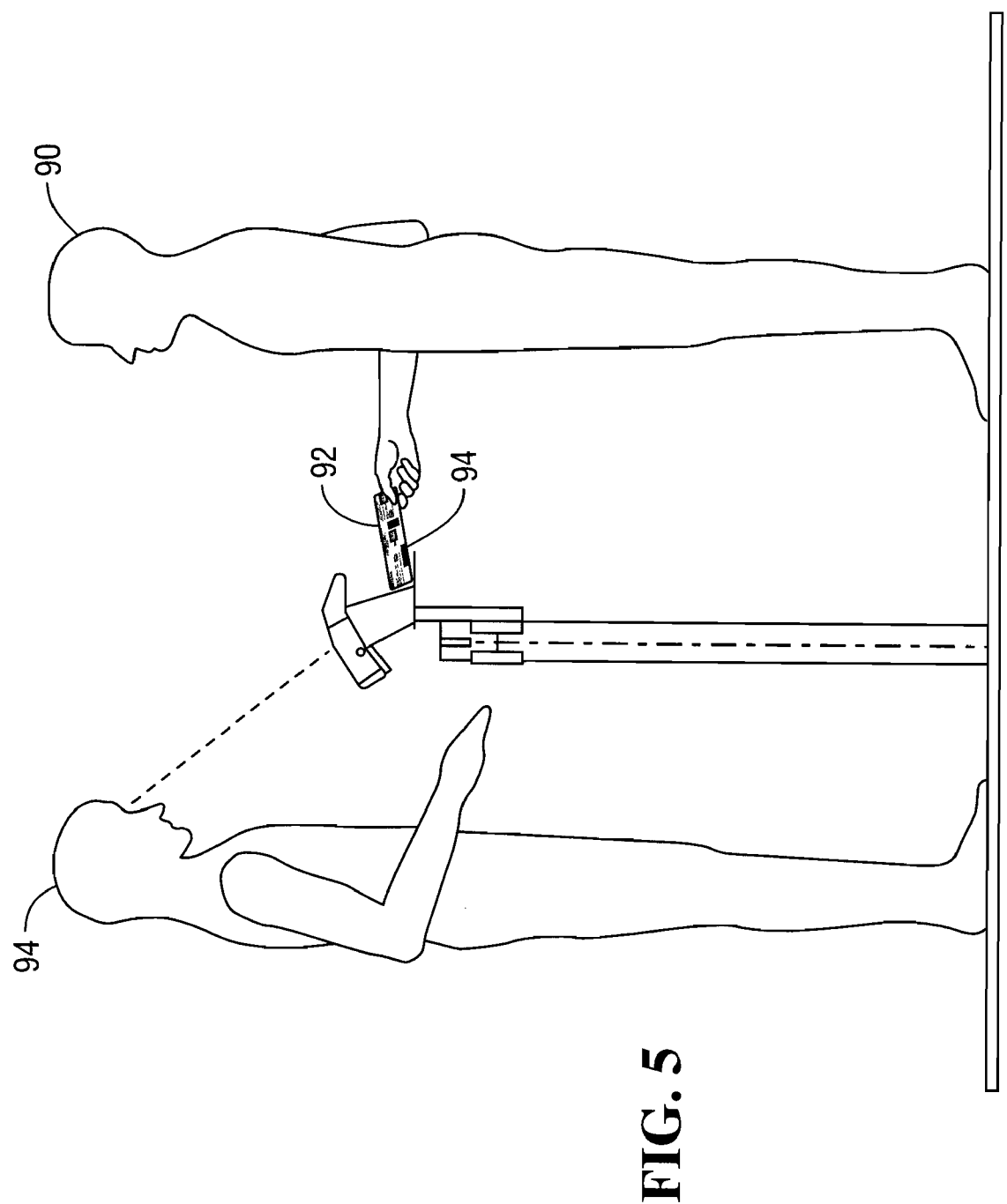
FIG. 5 is a view illustrating an example operation of the including the barcode reading station.

With reference to FIG. 5, an example operation of barcode reading station 10 is illustrated. This example is based upon one airport or transportation boarding venue, a security checkpoint; however, other venues, transportation and otherwise, are also envisioned. For example, another transportation venue may include scanning boarding passes at departure gates.

Barcode reading station 10 is located at a security checkpoint. A passenger 90 places a boarding pass 92 within scan volume 48, on or above barcode reading table 14 on one side of barcode reading station 10. A security person 94 operates barcode reading terminal 22 on an opposite side of barcode reading station 10 to control barcode reader 20. Barcode reader 20 reads barcode 94 on boarding pass 92. Advantageously, security person 94 does not need to hold barcode reading terminal 22, for example, upside down, during barcode reading.

Although particular reference has been made to certain embodiments, variations and modifications are also envisioned within the spirit and scope of the following claims.

What is claimed is:

1. A barcode reading station comprising:
a holster for a barcode reader, the barcode reader producing a scan volume;
a mirror; and
a barcode reading table separate from the holster for identifying a target location for reading a barcode positioned between the table and the mirror;
wherein the mirror is for deflecting the scan volume of the barcode reader towards the barcode reading table.

2. The barcode reading station of claim 1, wherein the holster comprises:
a bottom support wall;
a right side support wall coupled to the bottom support wall; and
a left side support wall coupled to the bottom support wall.

3. The barcode reading station of claim 1, wherein the holster further comprises clamp for retaining the barcode reader.

4. The barcode reading station of claim 1, wherein the holster is oriented at a downward angle from horizontal.

5. The barcode reading station of claim 1, wherein the table is coupled to the holster.

6. The barcode reading station of claim 1, wherein the table comprises an overlay for communicating scan volume location.

7. The barcode reading station of claim 1, further comprising a hood coupled to the holster, wherein the mirror is coupled to the hood.

8. The barcode reading station of claim 1, further comprising a mounting pole.

9. The barcode reading station of claim 8, further comprising a base plate coupled to the mounting pole.

10. The barcode reading station of claim 9, wherein the base plate includes an angular adjustment bracket.

11. The barcode reading station of claim 1, wherein the holster defines a first position for operating the barcode reader and the table defines a second position opposite the first position for placement of a barcode carrier within the scan volume.

12. A barcode reading station comprising:
a holster for a terminal including a barcode reader, the barcode reader producing a scan volume;
wherein the holster includes a clamp for retaining the terminal;
a hood coupled to the holster, including a mirror on one side of the hood; and
a barcode reading table separate from the holster for identifying a target location for reading a barcode between the table and the mirror;
wherein the mirror is for deflecting the scan volume of the barcode reader towards the barcode reading table.

13. A barcode reading station comprising:
a holster for a terminal including a barcode reader, the barcode reader producing a scan volume;
wherein the holster is oriented at a downward angle from horizontal;
a hood coupled to the holster, including a mirror on one side of the hood; and
a barcode reading table separate from the holster for identifying a target location for reading a barcode facing towards the mirror and away from the table;
wherein the mirror is for deflecting the scan volume of the barcode reader towards the barcode reading table.

14. A barcode reading station comprising:
a holster for retaining a terminal including a barcode reader, the barcode reader producing a scan volume from one end of the terminal;
a hood coupled to the holster adjacent the one end of the terminal and including a mirror on one side of the hood;
a support for the holster, wherein the holster is on a first side of the support; and
a barcode reading table separate from the holster and on a second side of the support opposite the first side for identifying a target location for reading a barcode between the table and the mirror;
wherein the mirror is for deflecting the scan volume of the barcode reader towards the barcode reading table.

15. The barcode reading station of claim 14, further comprising a freestanding pole, wherein the support is mounted to the freestanding pole.

* * * * *